Nov. 30, 1948.                C. E. HOLMES                2,455,176
                         SELENIUM RECTIFIER ELEMENT
                            Filed April 16, 1945
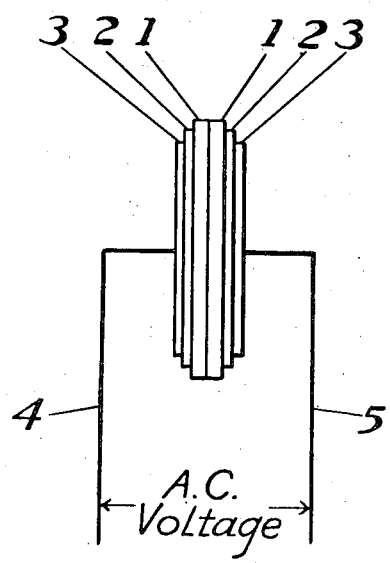
INVENTOR.
CARL E. HOLMES
BY George F. Mueller Patented Nov. 30, 1948

2,455,176

UNITED STATES PATENT OFFICE 2,455,176

SELENIUM RECTIFIER ELEMENT

Carl E. Holmes, La Crescenta, Calif., assignor to Fansteel Metallurgical Corporation, North Chicago, Ill., a corporation of New York Application April 16, 1945, Serial No. 588,642

4 Claims. (Cl. 175—366)

This invention relates to blocking layer rectifier devices, particularly to a method of electrically forming rectifier devices of the selenium type.

In the production of blocking layer devices having a semi-conductor layer, for example, selenium rectifiers, a rigid carrier electrode or supporting electrode is provided with a thin coating or layer of selenium. The supporting electrode may be formed of nickel, nickel-plated iron, aluminum, magnesium, berryllium or other metals and alloys. A common practice in the production of selenium rectifiers includes grit blasting the iron disc or plate and electro-plating the disk with nickel. The purpose of the grit blasting is to present a roughened surface to the selenium and to thereby improve the adherence of the selenium to the carrier electrode. The disc is then thoroughly cleaned and a thin film of selenium is applied over the nickel layer.

The selenium film or layer may be formed by a variety of methods. The plate or disc may be heated to a temperature above the melting point of selenium, for example, to a temperature of from 230° to 250° C., and the selenium in stick form may be rubbed across the heated plate in order to melt the selenium and form the desired film. Another method of application includes placing a measured quantity of powdered selenium or selenium in pellet form on the heated plate and flowing the melted selenium over the surface. The melted selenium is usually spread over the heated plate by mechanical means, as with a glass rod. The selenium may also be deposited on the carrier electrode from a vapor phase. The vaporization method is commonly employed in depositing the selenium film upon the light metal carrier electrodes. Various materials may be added to the selenium to increase its conductivity and otherwise impart desired characteristics and properties.

The selenium is then transformed into its gray crystalline state by heat treatment. The coated discs are generally stacked with mica, aluminum or other inert, smooth-surfaced discs or washers in contact with the selenium and between adjacent plates, and the stack subjected to a moderate pressure. The stacks under pressure are then subjected to a relatively low temperature, that is, at a temperature below 150° C., and maintained at such temperature for from one hour to four or five hours. During this stage of the heat treatment the selenium softens so that the pressure produces a layer of selenium of relatively uniform thickness and having a smooth surface.

The stacks are withdrawn from the oven or heat treating furnace and the plates are removed from the stack. The plates are then given a further heat treatment at a temperature approaching the melting point of selenium. This heat treatment is generally conducted at temperatures between about 200° C., and the melting point of selenium, for example, about 210° C., for a period of from fifteen minutes to several hours. During the combined heat treatment, a layer of selenium is produced having a smooth surface of more or less uniform thickness and the selenium is transformed from its amorphous, non-conducting form into its gray, crystalline, conducting form.

The smooth surface of the selenium film is then treated to form an artificial blocking layer and a counter-electrode consisting of a relatively low melting point alloy is applied, as by spraying, over the selenium coating.

The final step in the manufacture of the rectifier elements or plates consists of an electrical forming operation. In this step the plate is subjected to an electrical current by applying to the plate an alternating current voltage or by applying to the plate in the reverse or blocking direction a direct current voltage until a high resistance is developed in the reverse direction.

In the use of a direct current voltage, the voltage is applied in the reverse or blocking direction of the rectifier. The applied voltage may be either a relatively constant voltage, or a relatively low voltage may be applied during the initial stages of the forming period and gradually increased to a voltage of about 21 volts. Another forming method which has been proposed includes applying to the rectifier element a pulsating direct current voltage in the reverse or blocking direction.

In the use of an alternating current to effect the forming of the plates it has been necessary to provide a current limiting resistance because the current flows in the forward direction of the rectifier plate during one-half of the cycle. This limiting resistance introduces an appreciable power loss and since only one-half cycle is applied in the reverse or blocking direction of the rectifier plate a longer forming period is required. In these prior art forming methods a period of from 2 hours to 6 or 8 hours is required to complete the electrical forming operation.

During the electrical forming operation the reverse resistance of the rectifier is greatly increased. For example, upon the application of a direct current voltage of 8 volts to the rectifier element in the reverse or blocking direction, the current flow through the rectifier is about 40 milliamperes per square centimeter of selenium area. After the electrical forming treatment, the current flow in the reverse direction for the same applied voltage is negligible, being of the order of 2 milliamperes per square centimeter of selenium area at an applied direct current voltage of 20 volts.

The principal object of this invention is to provide an electrical forming method which employs an alternating current.

Another object of this invention is to provide an electrical forming method which substantially reduces the time required for electrical forming.

Other objects and advantages of this invention will become apparent from the following descriptions and claims.

In the forming operation of my invention the carrier electrodes 1 of two selenium rectifier plates are connected electrically, for example, by placing them in a suitable mounting means in back to back relationship. It is obvious that two series of rectifier plates could be connected in this manner, if desired. In the drawing, the selenium or other semi-conductor layer with or without a chemically formed blocking layer is represented by the ordinal 2. The counter-electrodes 3 applied over the semi-conductor layers are connected electrically to a source of alternating current by means of conductors 4 and 5. In my forming process an alternating current voltage of from about 18 volts to about 30 volts, preferably between about 21 volts to about 25 volts, somewhat higher than the normal applied voltage, is applied across the two counter-electrodes. If series of plates are so formed, the applied voltage must be increased proportionately.

I have found that this method of forming selenium rectifier plates requires from 15 to 30 minutes which is an appreciably lower period than that required by any electrical forming method known to the art.

One of the methods of inspecting selenium rectifier plates includes a measurement of the leakage current, that is, the current flow through the plate upon the application of a direct current voltage to the plate in the reverse or blocking direction. The voltage applied to the plate is usually about 8 volts and commercial rectifier elements will pass a leakage current of not more than about 0.5 milliampere per square centimeter of selenium surface.

The data which follow were obtained in the electrical forming of selenium rectifier plates in accordance with the foregoing described method. The rectifier plates have an area of about 12.11 square centimeters. Two rectifier plates were mounted between spring pressed electrodes, the supporting electrodes of the plates being in contact with each other and the counter-electrodes contacting the electrodes. An alternating current voltage of about 21 volts was applied across the electrodes.

| Time of Forming | Leakage Characteristics | | |
|---|---|---|---|
| | Applied D. C. Voltage | Leaking Current | Leakage Current per sq. cm. |
| | Volts | Ma. | Ma. |
| 20 minutes | 8 | 4.0 | 0.33 |
| | 8 | 3.4 | 0.28 |
| 15 minutes | 8 | 6.0 | 0.495 |
| | 8 | 4.6 | 0.38 |
| 15 minutes | 8 | 3.5 | 0.29 |
| | 8 | 2.8 | 0.23 |

The foregoing data illustrate that the leakage characteristics of selenium rectifier plates subjected to the electrical forming method of this invention are well within the limits allowable for commercial rectifier plates. It will be noted that the time required for electrical forming the rectifier plates is appreciably lower than that required for the various prior methods.

It is obvious that if desired, the counter-electrodes of two rectifier elements may be connected electrically and the alternating current voltage applied across the supporting electrodes.

I claim:

1. In a method of producing selenium rectifier elements the steps which comprise connecting electrically like electrodes of two selenium rectifier elements and applying to the other pair of electrodes an alternating current voltage of from about 18 volts to about 30 volts for a sufficient period of time so as to develop a high resistance in the elements in the reverse direction, the magnitude of this resistance being such that upon application of a direct current voltage of about 8 volts in the reverse direction the leakage current will not exceed about 0.5 milliampere per square centimeter.

2. In a method of producing selenium rectifier elements the steps which comprise connecting electrically like electrodes of two selenium rectifier elements and applying to the other pair of electrodes an alternating current voltage exceeding the alternating current voltage normally applied to selenium rectifiers for a period of from about 15 minutes to about 30 minutes whereby a high resistance is developed in the elements in the reverse direction.

3. In a method of producing selenium rectifier elements the steps which comprise connecting electrically like electrodes of two selenium rectifier elements and applying to the other pair of electrodes an alternating current voltage of from about 18 volts to about 30 volts for a period of from about 15 minutes to about 30 minutes whereby a high resistance is developed in the elements in the reverse direction.

4. In a method of producing selenium rectifier elements the steps which comprise connecting electrically like electrodes of two selenium rectifier elements and applying to the other pair of electrodes an alternating current voltage of from about 21 volts to about 25 volts for a period of from about 15 minutes to about 30 minutes whereby a high resistance is developed in the elements in the reverse direction.

CARL E. HOLMES.

REFERENCES CITED

The following references are of record in the file of this patent:

UNITED STATES PATENTS

| Number | Name | Date |
|---|---|---|
| 2,172,200 | Hein | Sept. 5, 1939 |
| 2,237,802 | Wittke | Apr. 8, 1941 |
| 2,241,908 | Herrmann | May 13, 1941 |
| 2,246,161 | Adenstedt et al. | June 17, 1941 |
| 2,375,181 | Williams | May 1, 1945 |
| 2,378,411 | Katterman | June 19, 1945 |